INVENTOR
GERRIT MOL
MATTHEUS JACOBUS SCHMITZ
BY
AGENT

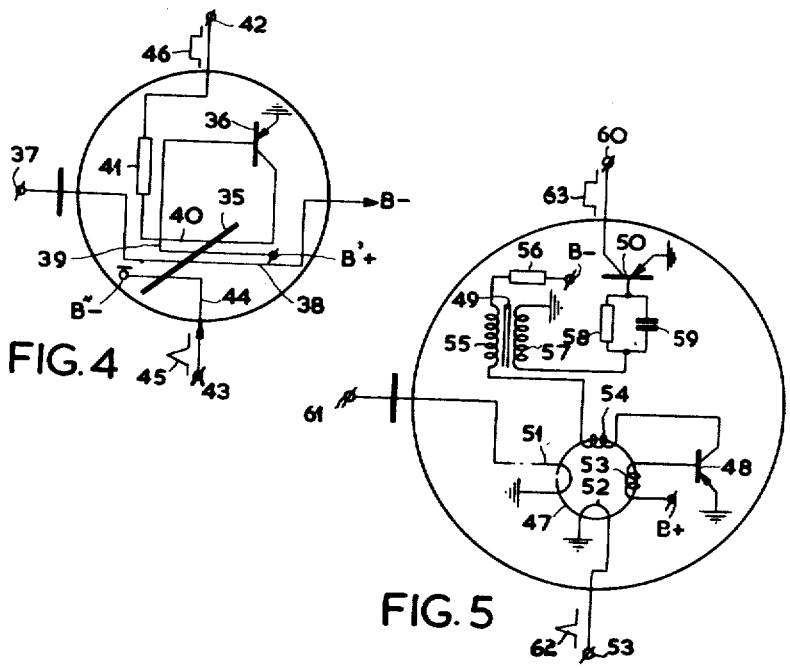

United States Patent Office 3,079,589
Patented Feb. 26, 1963

3,079,589
CIRCUIT ARRANGEMENT FOR PROCESSING AN INPUT INFORMATION IN A CONDITIONALLY PRESCRIBED ORDER OF SUCCESSION
Gerrit Mol and Mattheus Jacobus Schmitz, Hilversum, Netherlands, assignors to North American Philips Company, Inc., New York, N.Y., a corporation of Delaware
Filed June 9, 1959, Ser. No. 819,076
Claims priority, application Netherlands June 13, 1958
2 Claims. (Cl. 340—172.5)

The invention relates to a circuit arrangement to cause an input information to be processed in a conditionally prescribed order in a plurality of information handling apparatus, each of which converts the input information received into an output information containing a proper part, which is handled in the information handling apparatus next to it in the programme or which may constitute the final information, if the program terminates in this apparatus, and an instruction designating the apparatus which has to handle the information delivered by the apparatus concerned. The arrangement comprises a non-permanent switching storage for temporarily storing the part of the information supplied by an apparatus or a source of input information which has to be handled in another apparatus, and a permanent instruction storage in which all information necessary for controlling a number of conditional programs is stored. Circuit arrangements of this kind may be employed, for example, in information-processing machines such as computers, automatic pilots, automatic telephone and telegraph exchanges, automatic control-mechanisms of machine tools and so on. Such an arrangement is comparatively simple, if the input information is to be processed in a constant order of succession in a plurality of apparatus, i.e. if the arrangement has to perform a non-conditional program. If the arrangement is to be capable of controlling a plurality of different, non-conditional programs, the input information may contain a designation of the program to be performed. Even a circuit arrangement suitable to this end can, as a rule, be designed without difficulty. However, if the course of a program depends upon the output information from some of the apparatus of the program concerned, which case is referred to as a conditional program, it is conventional to construct the apparatus so that they derive, from the incoming information, besides the result of the handling of information received from the foregoing apparatus, a designation of the apparatus which has to handle the information next on the program. This part of the output information from an apparatus is termed the instruction, whereas the part of the output information which is to be handled in further steps, if any, is the proper part of the output information. A conditional program is obtained, for example, if the proper part of the output information supplied by one of the apparatus is an information of the "yes-no" type and if the program continues in different ways depending upon whether the output information is "yes" or "no." In the event the information is "yes" this apparatus has therefore to provide another instruction than in the case the information is "no." The aforesaid system, however, fails, if the way in which the program must be continued depends not only upon the output information supplied by a definite apparatus, but also upon the preceding steps of the program, which is the case, for example, if the same apparatus is employed two or more times in the same program or is employed in two or more different programs. A solution for this problem could be found in that the apparatus with which a program can continue in different manners with the same type of the proper part of the output information, receive, in addition, information relating to the program in progress and, if necessary, also to the state to which said program has already advanced. The apparatus then has to derive the new instruction from this additional information. However, this usually involves great complications of these apparatus, since additional intelligence has to be provided therein. It appears to be advantageous to concentrate as far as possible the intelligence, as far as the course of the program is concerned, in a control-part of the arrangement. The object of the invention is to provide a simpler solution of this problem.

In accordance with the invention each apparatus is designed so that, when supplying a given type of output information, it activates, for sending out, a number of instructions stored at different locations in the instruction storage. Each instruction contains (apart from an indication of the apparatus next to the apparatus concerned in the program) information about the location of the instruction storage which is to be read in the following step of the program. The circuit arrangement also comprises means for causing the supply of output information by an input-information source or by one of the apparatus to be always followed by a signal causing that one of the locations of the instruction storage supplied by the input-information source or the said apparatus is read out, this reading out producing a first signal, by which the information stored in the auxiliary memory or part of this information is transferred to the apparatus next to the said apparatus in the program, and a second signal which designates the location of the instruction storage that will be sent out during the next following step, so that in each step of the program only the location of the instruction storage indicated during the preceding step is read out.

The invention does not depend upon either the code used for storing and transmitting information, or upon the means used therefor. Hence the transfer may be performed as well via one or more conductors as via a radio communication. If the information is coded by means of an $m$-from-$n$ code, and each code element is transmitted by means of $n$ wires, the information transfer may be checked in the manner described in United States patent application Serial No. 793,522, filed February 16, 1959, now Patent No. 3,012,151.

One embodiment of the invention will be described more fully with reference to the drawing.

FIG. 3 shows a table of the instructions permanently stored in the instruction storage, indicating the location of storage and the apparatus to which it corresponds.

FIG. 4 shows the diagram of a storing pulse generator.

FIG. 5 shows the diagram of a different storing pulse generator.

Figure 1:
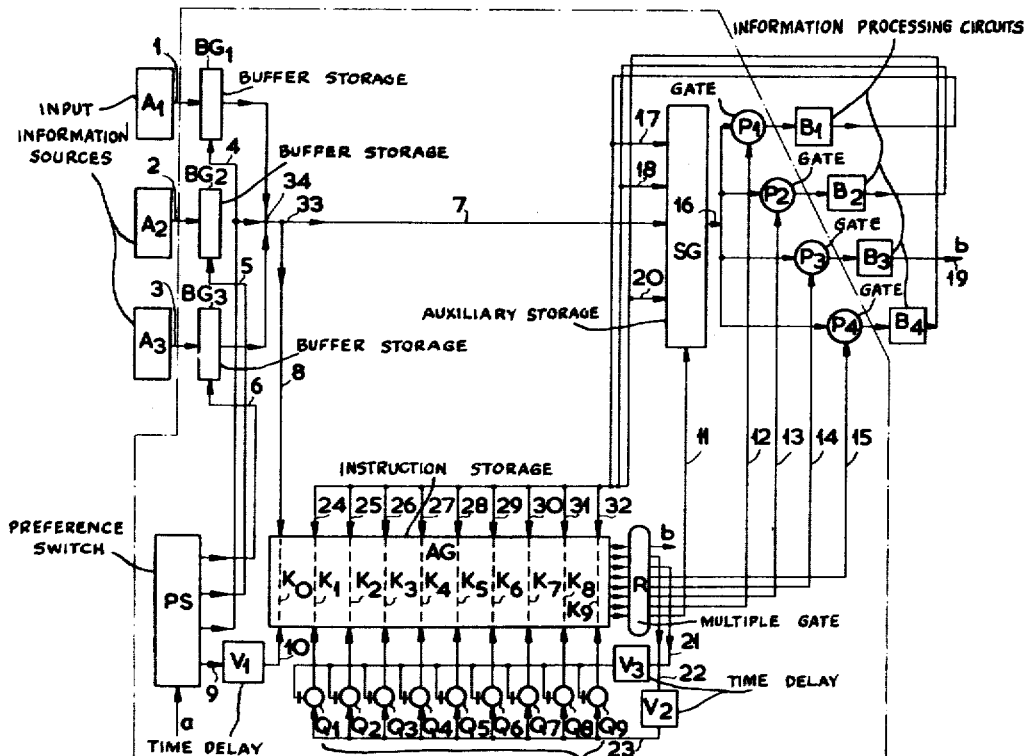
FIG. 1 shows a block diagram of a circuit arrangement according to the invention.

Referring to FIG. 1, references $A_1$, $A_2$ and $A_3$ designate three input-information sources capable of supplying an input information to the arrangement, $B_1$, $B_2$, $B_3$ and $B_4$ designate four apparatus for processing this input information in order of succession. The control-part of the arrangement is illustrated in blocks within the dot-and-dash line and comprises three buffer storages $BG_1$, $BG_2$, $BG_3$ (one for each input-information source), an auxiliary storage SG, an instruction storage AG, a preference switch PS, three delay elements $V_1$, $V_2$, $V_3$, four gates $P_1$, $P_2$, $P_3$, $P_4$, nine storing pulse generators $Q_1$, $Q_2$, $Q_3$, $Q_4$, $Q_5$, $Q_6$, $Q_7$, $Q_8$, $Q_9$ and a multiple gate R. The storing pulse generators are circuits having an input terminal (which is indicated in FIG. 1 by an arrow pointing to the circle representing the storing pulse generator), a setting terminal (which is indicated in FIG. 1 by a small transverse dash) and an output terminal (which is indicated in FIG.

1 by an arrow pointing away from the circle representing the storing pulse generator). A pulse fed to the input terminal of a cocking gate is passed only when previously a pulse has been supplied to the setting terminal. The supply of a pulse to the setting terminal is termed the setting of the storing pulse generator and the supply of a pulse to the input terminal of a storing pulse generator, is termed firing of the storing pulse generator. A storing pulse generator can therefore only deliver an output pulse if it has been previously set. Once fired, the storing pulse generator delivers a new output pulse only when it has been set again. The pulses fed to the setting terminal and to the input terminal must usually have a prescribed polarity, but this is irrelevant to the invention. The storing pulse generator may furthermore produce an amplification and a modification of the waveform of the pulse fed to its input terminal, which, however, is also irrelevant to the invention.

In FIG. 1 lines with arrows indicate the directions in which the information traverses the arrangement. These lines are termed herein paths, in order not to determine definitely the nature of the transmission means. Therefore a path may be a single wire or multi-wire connection, or a radio communication or some other information-transmitting agent. Moreover, parts of two or more paths may coincide. For example, from each of the three buffer storages $BG_1$, $BG_2$, $BG_3$ information is transferred both to the auxiliary storage SG (via the path 7) and to the column $K_0$ of the instruction storage AG (via the path 8); from the buffer storages $BG_i$ ($i=1, 2, 3$) to the point 33 the paths 7 and 8 thus coincide. Thus at the point 34, the three combinations of a part of path 7 and a part of path 8 each coincide. The apparatus $B_1$, $B_2$, $B_4$ can each supply information to the auxiliary storage SG (via the paths 17, 18 and 20 respectively) and to a number of the columns $K_1$, $K_2$ . . . $K_9$, each of which contains a number of locations of the instruction storage AG (via a number of the paths 24, 25 . . . 32 respectively). The path 24 thus comprises information-transmitting means, associated with each of the three apparatus $B_1$, $B_2$, $B_4$ and the paths emanating from each of these three apparatus comprise information-transmitting means leading to the auxiliary storage SG and to a number of the columns $K_1$, $K_2$ . . . $K_9$.

Figure 2:
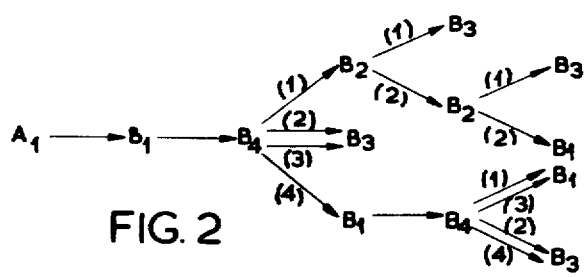
FIG. 2 shows the diagram of a conditional program.

In order to explain the operation of the arrangement shown in FIG. 1, it will be assumed that it has to be capable of controlling the program shown in FIG. 2 which starts from the input-information source $A_1$. The apparatus $B_2$ can supply two different types of output-information, which are distinguished by the signs (1) and (2). The apparatus $B_4$ is capable of supplying four different types of output information, which are designated by the signs (1), (2), (3), (4). After the apparatus $B_4$ has been passed in the second step of the program, the program continues via $B_2$, when the apparatus $B_4$ has supplied an output information of the type (1). The program terminates in $B_3$, when the apparatus $B_4$ has supplied an output information of the type (2) or (3), and the program continues via the apparatus $B_1$, when the apparatus $B_4$ has supplied an output information of the type (4). The further bifurcation points of the program must be interpreted in a similar manner.

When the apparatus $B_3$ is reached, the program always terminates. This apparatus may therefore be constructed without any appreciable complication. Its output information may contain a datum indicating that the control-part of the arrangement can again be put into the state in which a new program can be started; this state will be termed the initial state of the control-part. The datum bringing the control-part into the initial state may be a pulse which is fed to the preference switch and which causes the program to be started from the information-filled buffer storage which has the highest preference.

The program may also terminate at apparatus $B_1$, but this apparatus may also occur at the middle and at the beginning of the program. If it was desired to construct this apparatus also in a manner such that its output information contained a datum indicating that the control-part can be reset to the initial state, when the end of a program is reached, this could be performed only at the cost of great complications. This datum is therefore supplied by the address memory; it is thus ensured that all non-trivial intelligence relating to the program is concentrated in the control-part.

The arrangement of FIG. 1 operates as follows: If one of the apparatus $A_i$ ($i=1, 2, 3$) contains information, this is transmitted via the path 1, 2 or 3 to the corresponding buffer storage $B_i$. The unit must, of course, be such that an apparatus $A_i$ cannot transmit information to the corresponding buffer storage $BG_i$, when the latter already contains information. However, it may occur that two or more buffer memories contain information. The preference switch PS then determines which input information has the highest preference, i.e. which is to be processed first. It will be assumed that this is the information emanating from the input-information source $A_1$ and stored in the buffer storage $BG_1$. This information contains proper part, which is to be processed in the apparatus $B_j$ ($j=1, 2, 3, 4$) or at least in a few of them and a address part, which contains the address of the apparatus $B_j$, which has to perform the first processing of the proper part of the input information, and an information about the place in the address memory where the address of the apparatus is found, which has to perform the second processing of the proper part of the information.

The first step of the program starts when the preference switch PS supplies, via the path 4, a read-out pulse to the buffer storage $BG_1$ and simultaneously, via the path 9, a pulse to the delay element $V_1$. Thus the proper part of the input information is transmitted through the path 7 to the auxiliary storage SG, whereas the address part is transferred to the column $K_0$ of the instruction storage AG. The pulse delivered by the delay element $V_1$ is transmitted by path 10 as a read-out pulse to the column $K_0$ of the address memory AG and the delay must be sufficiently large in order to prevent this pulse from being applied to the said column before the address has been completely written in it and thus the column is in the state suitable for being read-out. The read-out of the column $K_0$ produces, via the path 12, a pulse to the gate $P_1$, which is thus temporarily opened. At the same time, a read-out pulse is fed via the path 11 to the auxiliary storage SG and via the path 21 and the delay element $V_3$, to be described hereinafter, a pulse is fed to the cocking terminal of the cocking gate $Q_1$. Thus, the information stored in the auxiliary storage SG, at least the part thereof which is important for the apparatus $B_1$, is transmitted via the path 16 and the then opened gate $P_1$ to the apparatus $B_1$ and the cocking gate $Q_1$ is cocked. The gates $P_2$, $P_3$, $P_4$ are closed at this instant, so that no information is transmitted to the apparatus $B_2$, $B_3$, $B_4$. In the apparatus $B_1$ the incoming information is processed in a manner which is irrelevant. It may occur, therefore, that the apparatus $B_1$ needs only part of the information stored in the auxiliary storage SG, in which case it may suffice to transmit only this part of the information stored in the auxiliary storage to the apparatus $B_1$ and to keep the further information in the auxiliary storage. It may even occur that the information to be supplied by the apparatus $B_1$ is independent of the information stored in the auxiliary storage. In this case, the apparatus $B_1$ needs receive only a signal indicating this apparatus to supply output information. This signal may be supplied directly by the instruction storage, so that no path needs be provided from the auxiliary storage SG to the apparatus $B_1$ and the gate $P_1$ may be dispensed with. The processing of information means therefore in this case the addition of independent information. To the further apparatus $B_2$, $B_3$, $B_4$ apply similar remarks.

After some time the apparatus $B_1$ supplies the desired output information and the second step of the program starts. The proper part of the output information supplied by the apparatus $B_1$ is transferred via the path 17 to the auxiliary storage. The output information of the apparatus $B_1$ contains, furthermore, a number of address parts, which are written through a number of the paths 24, 25, 26, 27, 28, 29, 30, 31, 32 in a number of columns of the instruction storage. Owing to the writing in these columns a pulse is supplied via the path 22 to the delay element $V_2$, this pulse containing, consequently the information: "The apparatus operative in this step has delivered its output information." Then the pulse delayed by the delay element $V_2$ is fed to the inputs of all cocking gates $Q_k$ ($k=1, 2, 3 \ldots 9$). Since, of these gates, only the cocking gate $Q_1$ is cocked, only this gate is fired. The delay of the delay element $V_2$ must be so large that a cocking gate is fired not until the addresses have been completely written in corresponding columns of the instruction storage. The pulse from the cocking gate is fed, as a reading pulse, to the column $K_1$ of the instruction storage AG. The address part written by the apparatus $B_1$ in the column $K_1$ must be such that by reading it out, via the path 15, a pulse is fed to the gate $P_4$, via the path 11, a reading pulse is fed to the auxiliary storage SG and via the path 21 and the delay element $V_3$ a pulse is fed to the cocking terminals of the cocking gates $Q_1$. This is called the information: "Open $P_4$ and cock $Q_1$," which information is designated by the symbol $P_4$; $Q_1$. The delay element $V_3$ serves to prevent the cocking gate $Q_1$ from receiving a cocking pulse before it has recovered from the preceding firing. In FIG. 3 the address parts supplied by the apparatus $B_1$, $B_2$, $B_4$ and the columns in which they are written are indicated in a table. Owing to the firing of the cocking gate $Q_1$ the information stored in the auxiliary memory SG is transferred via the gate $P_4$, which is then open, to the apparatus $B_4$ and the cocking gate $Q_1$ is recocked.

After some time the apparatus $B_4$ supplies the desired output information, which initiates the third step of the program. The proper part of the information supplied by the apparatus $B_4$ is transferred via the path 20 to the auxiliary storage SG, whereas the address parts also supplied by the apparatus $B_4$ are written via a number of the paths 24, 25, 26 . . . 32 in a number of the columns of the instruction storage AG. In order to prevent the presence of address parts of the preceding apparatus (in this case the apparatus $B_1$) in the instruction storage AG, a pulse may be produced each time after the firing of a cocking gate, this pulse closing temporarily the gate R in the outputs of the instruction storage and erasing all columns of the instruction storage. This process must, of course, be completely finished before new address parts can be written in the instruction storage. A suitable apparatus to this end may be designed readily by known means and is therefore not shown in the drawing. The writing in the columns of the instruction storage produces again a pulse containing the information "The apparatus operative in this step has delivered its output information." This pulse is fed again to the delay element $V_2$ and then, with a certain time lag, to the inputs of all cocking gates $Q_k$. However, of these cocking gates, only the gate $Q_1$ is cocked, so that only this gate is fired and the column $K_1$ is read out. If the apparatus $B_4$ has supplied an output information of the type (1), column $K_1$ must contain the information: "Open $P_2$ and cock $Q_1$" (symbol $P_2$; $Q_1$); if the apparatus $B_4$ has supplied an output information of the type (2) or (3), column $K_1$ must contain the information: "Open $P_3$" (symbol $P_3$); if the apparatus has supplied an output information of the type (4), column $K_1$ must have the information: "Open $P_1$ and cock $Q_2$" (symbol $P_1$; $Q_2$). In all cases the reading-out of column $K_1$ opens temporarily the gate $P_j$ required by the program and the information stored in the auxiliary storage is transferred to the apparatus $B_j$ required by the program. This is the apparatus $B_2$, if the apparatus $B_4$ has supplied an output information of the type (1), the apparatus $B_3$, if the apparatus $B_4$ has supplied an output information of the type (2) or (3) and the apparatus $B_1$, if the apparatus $B_4$ has supplied an output information of the type (4). Since the program always terminates, when the apparatus $B_3$ is reached, none of the cocking gates $Q_k$ need be cocked in the cases (2) and (3), so that the address part is reduced in these cases to the information: "Open $P_3$." Since furthermore, in the case of an output information of the type (4) the program continues via the apparatus $B_1$ and the address part written by this apparatus in the column $K_1$ has already a different function, a different address part of the apparatus $B_1$ must be used, in this case the address part written by this apparatus in the column $K_2$. Therefore, if the apparatus $B_4$ supplies an output information of the type (4), it writes the address part: "Open $P_1$ and cock $Q_2$" (symbol $P_1$; $Q_2$) in column $K_1$.

In the aforesaid manner the whole program may be followed step by step and all address parts required for the program can be determined, as well as the columns in which they are to be written. FIG. 3 shows a table thereof. It appears that the program starting by the input information source $A_1$ occupies, apart from the column $K_0$, three further columns of the instruction storage. The instruction storage must, of course, also have available a number of columns for each of the programs starting by the further input information sources.

In the arrangement shown in FIG. 1 the column $K_1$ of the instruction storage is employed only for the address parts supplied by the buffer memories $BG_1$. This detail is, however, not important for the idea of the invention, since this column may be as well used for address parts supplied by the apparatus $B_j$.

From the foregoing it appears that, in general, the number of address parts which an apparatus is to be capable of delivering for a given program for each type of output information is equal to the times the apparatus occurs in the program. Thus, in the program illustrated in FIG. 2, the apparatus $B_2$ and $B_4$ occur each twice, whilst each of these apparatus for each type of output information supplies a pulse which activates two instructions stored in two different columns of the instruction storage AG. However, this number is a maximum, since the program may be degenerated, in which case fewer instructions are required. These degenerations may consist in that the program always terminates, when a given apparatus is reached (as is the case with the apparatus $B_3$, which occurs twice in the program, and produces, when supplying output information, a stop pulse $b$, which can be used as a start pulse $a$ for the preference switch PS, but which does not correspond to an instruction. Also, one or more programs may have from a given information handling apparatus onwards, identical branches (as is the case with the apparatus $B_1$, where two branches of the program terminate; in spite of the fact that the apparatus $B_1$ occurs four times in the program, it corresponds to only three instructions). In fact, the first-mentioned case of degeneration is a particular case of the second.

It is particularly advantageous to use, as memory storage elements of the instruction storage, rings of a magnetic material with a rectangular hysteresis loop. In the case illustrated in FIG. 1 the columns of the instruction storage comprise, at the most, 16 rings which may be distinguished as the rings: "Stop," "Firing," $Q_1$, $Q_2$, $Q_3$, $Q_4$, $Q_5$, $Q_6$, $Q_7$, $Q_8$, $Q_9$, $P_1$, $P_2$, $P_3$, $P_4$ and SG.

Through the column $K_0$ four wires are taken, i.e., a reset wire, a wire starting from the buffer storage $BG_1$, a wire starting from the buffer storage $BG_2$ and a wire starting from the buffer storage $BG_3$. The reset wire traverses all rings of the column $K_0$ and, in series herewith, also all rings of all further columns. If a sufficiently strong current pulse with a given polarity is conveyed through the reset wire, all rings of all columns are magnetized in a given sense of circulation; this state of the rings is termed, for the sake of simplicity, the state zero. The wire starting from the buffer storage $BG_1$ is taken through the rings of the column $K_0$ so that the rings "Fire," $Q_1$, $P_1$ and SG are brought into the state 1, whereas all further rings of the said column are not influenced, when the buffer storage $BG_1$ supplies output information upon the reception of a read out pulse from the preference switch. A wire starting from the apparatus $B_1$ is taken through the rings "Fire," $Q_1$, $P_4$ and SG of the column $K_1$ and in series herewith through the rings "Fire" $Q_2$, $P_4$ and SG of the column $K_2$ and through the ring "Stop" of the column $K_3$ so that these rings are driven into the state 1, whereas all further rings of these columns are not acted upon, when this wire conveys a current pulse, i.e., when the apparatus $B_1$ delivers output information. From the apparatus $B_2$ two wires are led to the instruction storage; the first wire conveys a current pulse, when the apparatus $B_2$ supplies an output information of the type (1) and the second conveys a current pulse, when this apparatus supplies an output information of the type (2). The first wire is taken in series through the rings "Fire," $P_3$ and SG of the columns $K_1$ and $K_2$, the second, however, through the rings "Fire," $Q_2$, $P_2$ and SG of the column $K_1$ and through the rings "Fire," $Q_3$, $P_1$ and SG of the column $K_2$. From the apparatus $B_4$ four wires are led to the address memory; the first wire conveys a current pulse, when the apparatus $B_4$ supplies an output information of the type (1), the second conveys a current pulse, when the apparatus $B_4$ supplies an output information of the type (2), the third wire conveys a current pulse, when the apparatus supplies an output information of the type (3) and the fourth wire conveys a current pulse, when the apparatus supplies an output information of the type (4). The first wire starting from the apparatus $B_4$ traverses the rings "Firing," $Q_1$, $P_2$ and SG of the column $K_1$ and the rings "Firing," $Q_3$, $P_1$ and SG of the column $K_2$. The second wire starting from the apparatus $B_4$ traverses the rings "Firing," $P_3$ and SG of the columns $K_1$ and $K_2$. The third wire starting from the apparatus $B_4$ traverses the rings "Firing," $P_3$ and SG of the column $K_1$ and the rings "Firing," $Q_3$, $P_1$ and SG of the column $K_2$. The fourth wire starting from the apparatus $B_4$ traverses the rings "Firing," $Q_2$, $P_1$ and SG of the column $K_1$ and the rings "Firing," $P_3$ and SG of the column $K_2$. All this may be directly seen from the table shown in FIG. 3. It appears furthermore that many rings in the columns are superfluous and may therefore be dispensed with. For example, the column $K_1$ need comprise only the rings "Firing," $Q_1$, $Q_2$, $P_1$, $P_2$, $P_4$ and SG and the rings "Stop," $Q_3$, $Q_4$, $Q_5$, $Q_6$, $Q_7$, $Q_8$, $Q_9$, $P_3$, $P_4$ may be omitted from this column.

When instructions are activated in the columns of the instruction storage a number of rings of a number of columns change over from the state zero into the state 1, so that pulses of a given polarity are produced; this polarity will be termed herein the negative polarity. When a storing pulse generator $Q_k$ is fired, a number of rings change over from the state 1 into the state zero, so that positive pulses are produced. When the reset wire conveys a pulse, all rings in the state 1 change over therefrom into the state zero, so that also positive pulses are produced. Each storing pulse generator $Q_k$ must be designed so that it is fired by a negative pulse at its input terminal and is set by a positive pulse at its setting terminal, whereas a positive pulse at its input terminal and a negative pulse at its setting terminal remain without effect. Each gate $P_j$ must be opened temporarily by a positive pulse. The time interval during which a gate $P_j$ remains open, after having been opened, must be long enough for the information emanating from the auxiliary memory SG to be transferred to the apparatus $B_j$ concerned, but it must not be considerably longer. The auxiliary memory SG must be read by a positive pulse supplied thereto by the path 11. The positive "Stop" pulse $b$, supplied by an instruction storage AG or the apparatus $B_3$ is transferred, as a start pulse $a$, to the preference switch PS. This switch may be an electronic step-by-step switch, which scans the buffer storages $BG_1$ upon the reception of a start pulse $a$, in the order of succession: $BG_1$, $BG_2$, $BG_3$. After having supplied a read out pulse to one of these buffer storages, the preference switch PS moves back to its home position.

The terms "positive" and "negative" pulse serve herein only to distinguish the pulses supplied by a ring at a change-over from the state zero into the state 1 and from the state 1 into the state zero. The polarity of this pulse in a conventional sense depends of course upon the manner in which the output wire concerned is taken through the said ring, so that a pulse termed "negative" in the foregoing sense may be, in the common sense, positive.

The invention is, of course, independent of the nature of the memory elements used in the auxiliary memory and the further storages and of the designs of the further members shown in FIG. 1 in the form of blocks, all of which may be of a known construction.

If the information is coded as an $m$-from-$n$ code, the control-method for the information transmission described in United States patent application Serial No. 793,522, filed February 16, 1959, may be employed. If only part of the information stored in the switching storage SG is transferred to the apparatus $B_j$, equivalent current pulses must, of course, also be fed to the control-device together with the non-transmitted information, in order to make this device function correctly.

In United States patent application Serial No. 793,522 is also described one embodiment of a storing pulse generator. The circuit illustrated in FIG. 7 of the said application may also be used for the gates $P_j$. Then wires starting from the auxiliary memory SG must be connected to the setting terminals and the wires emanating from the instruction storage AG must be connected via a delay element to the input terminals. A further equivalent arrangement is shown in FIG. 5 of the United States patent application Serial No. 740,794, filed June 9, 1958, now Patent No. 2,968,029. For the sake of completeness these figures and the description thereof are repeated in the present application.

FIG. 4 shows the diagram of the aforesaid embodiment of the storing pulse generator. This arrangement comprises a ring 35 of magnetic material with a rectangular hysteresis loop and a transistor 36. The setting terminal 37 of the arrangement is connected via a setting winding 38 to the negative terminal B— of a voltage source. The positive terminal B+ of a second voltage source is connected via a control winding 39 to the base of the transistor 36, of which the emitter is connected to earth and the collector via a winding 40 and a feedback resistor 41 to the output terminal 42 of the circuit. Finally, the input terminal 43 of the circuit is connected via an input winding 44 to the negative terminal B″— of a third voltage source. The terminals of these voltage sources not referred to are connected to earth. The voltage sources may, if desired, coincide partly. The windings, which are shown in the figure each in the form of a conductor passing through the ring 35, but may comprise in fact more than one winding, have the directions of winding indicated in the figure.

This storing pulse generator operates as follows: If, for example at an instant $t_1$, a pulse with a current direction towards the circuit, with a sufficiently long duration and with a sufficiently high current intensity is fed to the setting terminal 37, the ring 35 is driven into the state, which is termed the state 1. The voltage thus induced into the control winding 39 renders the base of the transistor more positive than it already was owing to the voltage source B′+, so that the transistor 36 is only blocked more strongly than it had been before. The negative pulse at the collector of the transistor does not cause any change in this respect. If then a pulse with a current sense directed towards the circuit is fed to the input terminal 43, the ring 35 starts changing over into the state zero, so that into the control winding 39 is induced a voltage which renders the base of the transistor 36 sufficiently negative to render it conductive. Thus a current is produced across the feedback winding 40, this current aiding the change-over of the ring 35 into the state zero. The result is that a very short input pulse 45 produces an output pulse 46 with a current intensity and a duration which are substantially independent of the input pulse. Use may be made of:

Transistor 36 _____ OC 72.
Ring 35 _____ Four rings 5659140/6E1 piled up.
Winding 38 _____ 40 turns (at 20 ma.).
Winding 39 _____ 28 turns.
Winding 40 _____ 8 turns.
Winding 44 _____ 40 turns (at 20 ma.).

It is furthermore evident that the setting winding 38 may be replaced by a plurality of parallel-connected setting windings, which provides the possibility of designing a storing pulse generator which can be set in two or more coincidences.

FIG. 5 shows a diagram of a second embodiment of the storing pulse generator. This circuit comprises a ferrite ring 47, a transistor 48, a transformer 49, and a transistor 500. The ferrite ring 47 comprises a setting winding 51, of which one end is connected to the cocking terminal 61 and the other end connected to earth, and an input winding 52, of which one end is connected to the input terminal 53 and the other end to earth, an output winding 53, which is connected at one end to a positive voltage source B+ and at the other end to the base of the transistor 48. The ferrite ring also comprises a feedback winding 54, which is connected on the one hand to the collector of the transistor 48 on the other hand to one end of the primary winding 55 of the transformer 49. The other end of this primary winding may be connected via a resistor 56 to the negative terminal B— of a voltage source. One end of the secondary winding 57 of the transformer 49 is connected to earth and the other end, via the parallel combination of a resistor 58 and a capacitor 59, to the base of the transistor 50. The emitter of this transistor is connected to earth and the collector to the output terminal 60. The directions of winding of the various windings 51, 52, 53 and 54 of the ferrite ring 47 are not arbitrary. It is assumed that the directions of the current pulses to be fed to the terminals 61 and 64 are positive, which is, otherwise, arbitrary. In the same way the direction of winding of the setting winding 51 may be chosen at will. Then the state into which the ferrite ring is driven by a sufficiently high positive current pulse across the setting winding 51 is called the state 1. The direction of input winding of the winding 52 must then be such that a sufficiently high positive current pulse through this winding causes the ferrite ring to change over from the state 1 into the state zero. The direction of winding of the output winding 53 must be such that the change over of the ferrite ring 47 from the state 1 into the state zero renders the base of the transistor 48 negative. The direction of winding of the feed-back winding 54 must be such that the current pulse occurring therein when the transistor 48 is conductive, aids the change-over of the ferrite ring from the state 1 into the state zero.

This storing pulse generator operates as follows: If a positive pulse is fed to the setting terminal 52, the ferrite ring 47 changes over into the state 1. If then a positive pulse is fed to the input terminal 53, the ferrite ring 47 changes over again into the state zero. The voltage pulse thus induced into the control winding 53 renders the base of the transistor 48 sufficiently negative to produce a current pulse at the collector thereof. This current pulse is conveyed through the feed-back winding 54, so that a pulse with a very steep front is obtained. This pulse is fed via the transformer 49 and the parallel connection 58, 59 to the base of the transistor 50, which becomes conductive for a moment; thus the output terminal 60 supplies a pulse with steep fronts.

The cocking gates shown in FIGS. 4 and 5 have, in addition, an amplifying and pulse-shaping function.

Reference is furthermore made to the possibility of using a plurality of read out wires instead of using one reading wire 11, which is particularly advantageous, if each time only part of the information stored in the switching storage SG is to be transferred to one of the apparatus $B_j$. If, for example, different parts of the information stored in the switching storage SG are to be transferred to the apparatus $B_1$ in different stages of the program, also the gate $P_1$ may, if necessary, be multiplied.

Finally, reference is also made to the possibility of providing a second auxiliary memory HG between the auxiliary memory SG and the apparatus $B_j$, this second auxiliary memory being used to rewrite the information read from the switching storage, after each transfer of information, into the auxiliary memory SG. This is particularly advantageous, if the information stored in the auxiliary memory SG is extended stepwise during the development of a program. This rewriting may, of course, also be accomplished by the apparatus $B_j$.

What is claimed is:

1. An information processing system for handling information in a conditional program, comprising a source of said information, a plurality of information handling apparatus each having an input and output terminal, non-permanent switching storage means having at least one input terminal, a read out terminal, and at least one output terminal, a plurality of gate means each having an input terminal connected to one output terminal of said switching storage means, an output terminal connected to the input terminals of a separate information handling apparatus, and a control terminal, permanent instruction storage means having a plurality of activating terminals, a plurality of read out terminals, and a plurality of output terminals, said instruction storage means being of the type that instructions stored therein can be produced at the output terminals of said instruction storage means by applying a pulse to an activating terminal and subsequently applying a pulse to the respective read-out terminal, a plurality of storing pulse generator means having a setting terminal, a firing terminal, and an output terminal, means connecting the output terminals of said pulse generator means to separate read-out terminals of said instruction storage means, means connecting the output terminals of each of said information handling apparatus to the input terminals of said switching storage means and to said activating terminals, means for connecting the output terminals of said instruction storage means to said control terminals, setting terminals, firing terminals, and said read-out terminal of said switching storage means whereby information in said switching storage means is selectively passed by one of said gate means to one of said information handling apparatus, and means connecting said source to said input terminal of said switching storage means and to one of said activating terminals.

2. An information processing system for handling information in a conditional program, comprising a source of said informaiton, non-permanent switching storage means having an input circuit, an output circuit, and a read-out terminal, means applying said information to said input circuit, a plurality of gate means each having an input terminal connected to said output circuit, an output terminal, and a control terminal, a plurality of information handling apparatus each having an input terminal connected to a separate said output terminal, and output circuit means, at least one of said information handling apparatus being arranged to deliver output information having a proper part and a pulse, means applying said proper part to said input circuit, permanent instruction storage means having a plurality of activating terminals, a plurality of respective read-out terminals, and first, second, third and fourth output terminal means, a plurality of storage pulse generating means each having an output terminal connected to a separate read-out terminal of said instruction storage means, a setting terminal, and a firing terminal, means connecting said first output terminal means to said read-out terminal of said switching storage means, means selectively connecting said second output terminal means to said control terminals, means selectively connecting said third output terminal means to said setting terminals, means connecting said fourth output terminal means to said firing terminal means, and means applying said pulses to said activating terminals, said instruction storage means being arranged to deliver a pulse to said fourth output terminal means upon the application of a pulse to said activating terminals, whereby any of said storing pulse generators that are set are fired, and to deliver a read-out pulse to said switching storage means, a control pulse to a predetermined gate means, and a setting pulse to a predetermined pulse generating means upon application of a pulse to a read-out terminal of said instruction storage means.

References Cited in the file of this patent

UNITED STATES PATENTS

| | | |
|---|---|---|
| 2,764,750 | Wright | Sept. 25, 1956 |
| 2,797,862 | Andrews | July 2, 1957 |
| 2,916,210 | Selmer | Dec. 8, 1959 |
| 2,918,662 | Cox | Dec. 22, 1959 |